United States Patent [19]

Suzuki

[11] Patent Number: 5,575,904
[45] Date of Patent: Nov. 19, 1996

[54] FLUID PROCESSING DEVICE WITH FILTER IN HELICAL CHANNEL TUBE

[75] Inventor: Akira Suzuki, Seto, Japan

[73] Assignee: Kabushiki Kaisha Aichi Ceramic Kogyosho, Aichi-ken, Japan

[21] Appl. No.: 261,382

[22] Filed: Jun. 15, 1994

[30] Foreign Application Priority Data

Apr. 2, 1993 [JP] Japan ................... 5-100369

[51] Int. Cl.⁶ ................................. B01D 35/18
[52] U.S. Cl. ........................ 210/186; 55/267; 55/523; 210/497.01; 210/512.1
[58] Field of Search ........................ 210/111, 184, 210/186, 295, 304, 416.4, 459, 497.01, 512.1, 460, 510.1, 499; 55/267, 523, DIG. 30; 422/180

[56] References Cited

U.S. PATENT DOCUMENTS 2,198,819  4/1940  Holm .................... 210/304
3,165,469  1/1965  Bruns et al. .......... 210/416.4
3,402,529  9/1968  Frantz .................. 210/304
3,887,741  6/1975  Dwyer .................. 428/188
5,112,478  5/1992  Mohr .................... 210/111

FOREIGN PATENT DOCUMENTS 123435  5/1989  Japan .
665927  6/1979  U.S.S.R. ............. 210/184

Primary Examiner—Joseph W. Drodge
Attorney, Agent, or Firm—Browdy and Neimark

[57] ABSTRACT

A fluid processing device purifies water, oil, or gas, and also mixes water and petroleum oils to form an emulsion. The device has a spiral tube having a central through-hole bored and a spiral communication fluid path surrounding the through-hole. A continuous porous filter is enclosed in the through hole. Fluid can pass not only within the filter but also along the spiral tube surrounding the filter. Even if clogging is produced at the flowing-in side of the filter, fluid still passes through the spiral path and is sent to the inside. The spiral communication hole path becomes a bypass and fluid enters the filter from multiple directions, whereby the contact area is enlarged.

6 Claims, 4 Drawing Sheets

FLUID PROCESSING DEVICE WITH FILTER IN HELICAL CHANNEL TUBE

BACKGROUND OF THE INVENTION

The present invention relates to a fluid processing device where quality improving processing such as purification of a contaminated water, activation of water, improvement of a fluid oil or purification of an exhaust gas is carried out, and processing is carried out so that water and petroleum oils are mixed and an emulsion fuel is formed.

In recent years, polymerization of lower molecules such as water, oil or the like is cut by radiation of electromagnetic wave in far infrared band and particles are miniaturized, i.e., activated thereby drinking water or fluid oil has been improved. In this case, continuous porous netlike substances made of ceramics provided by the present inventors in prior Japanese patent No. 1622923 are effectively used as filter members.

These filter members are used in enclosed state in a cylinder because they are brittle, but clogging occurs gradually. The clogging is significant particularly in the case of viscous liquids such as oil, and the clogging occurs from its flowing-in side in 20–30 hours in the case of light oil and in 4–5 hours in the case of heavy oil. Also in the case that exhaust gas of an internal combustion engine is at so low temperature as 200–300 degrees, the clogging occurs early and cannot be dealt with. Further a problem exists at present including a honeycomb catalyst which cannot be dealt with effectively.

SUMMARY OF THE INVENTION

An object of the present invention is to provide a fluid processing device where a fluid can pass smoothly while being contacted with a filter member securely, and even in a viscous liquid, clogging is reduced and maintenance can be carried out easily. Thereby purification of industrial waste water, securing of activation of drinking water and good combustion efficiency of oil can be obtained, and further prevention of environmental pollution can be intended.

Another object of the present invention is that water and petroleum oils are mixed well and an emulsion fluid is formed and processed.

Therefore the present invention is in a fluid processing device comprising a spiral tube having a through hole bored at the center and a spiral communication hole path leading to surround the outer circumference of the through hole, and a continuous porous filter member in netlike state to be enclosed in the through hole. The spiral tube and the filter member may be made of ceramics, and a heating wire may be wound in a concave surface on the outside of the spiral tube for heating. Further the spiral tube with the through hole enclosing the filter member may be installed and enclosed in an attaching cylinder, and a heat exchanging liquid or a heat exchanging gas may be filled and circulated between the outside of the spiral tube and the attaching cylinder for heating.

Regarding action of the present invention, since fluid can pass not only within the continuous porous filter member in netlike state but also along the spiral tube provided surrounding the outer circumference, even if clogging occurs at the flowing-in side of the filter member, the fluid can pass the spiral communication hole path and be sent to the inside. That is, the spiral communication hole path becomes a bypass and the fluid becoming the swirling flow enters the filter member in netlike state from multiple directions, thereby the contact area is enlarged and the fluid passes through the continuous porous filter member securely and good processing action can be intended.

Also if a heating wire is wound in a concave surface outside the spiral tube for heating or if a heat exchanging liquid or gas is filled and circulated between the outside of the spiral tube and an attaching cylinder for heating, fluidity of viscous substance such as oil to be processed becomes good. Particularly in processing of an exhaust gas, since surplus of oxygen is apt to occur in a Diesel engine and NOx is generated much at high pressure and free carbon is generated often due to relation of quality of fuel oil, if this passes through the spiral tube and the filter member with raised activation, transfer of oxygen between CO, CH, C, NOx and $O_2$ becomes lively at 500°–700° C., and due to the reaction heat, the reaction is continued without depending on supply of heat from the outside and gas becoming rapid swirling flow due to a spiral communication hole path is entered and diffused in the filter member of netlike state and the reaction is promoted and maintained. NOx generated under high pressure is reduced into nitrogen due to mutual reaction under such normal pressure, and exhaust substance as a whole becomes $H_2O$, $CO_2$, $N_2$ and the environmental maintenance can be intended.

Further, water and petroleum oil are injected under pressure of about 5 kg/cm² and pass through a continuous porous filter member thereby the mixed fuel can be obtained. Using this, length of flame at combustion within the furnace becomes short and the furnace temperature is lowered about 300° C. and both NOx and CO are decreased to about ¼. +dr

DESCRIPTION OF THE PREFERRED EMBODIMENT

Figure 1:
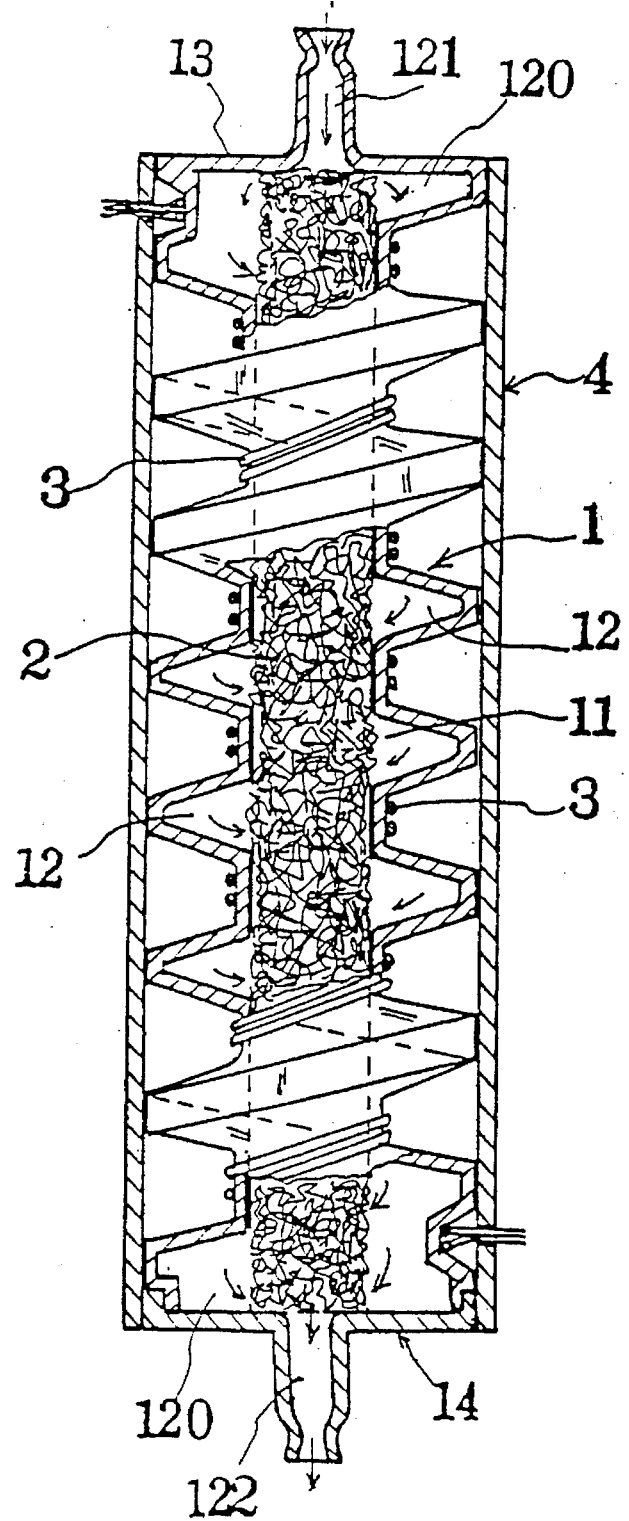
FIG. 1 is a longitudinal sectional view of an embodiment of the invention.
Figure 2:
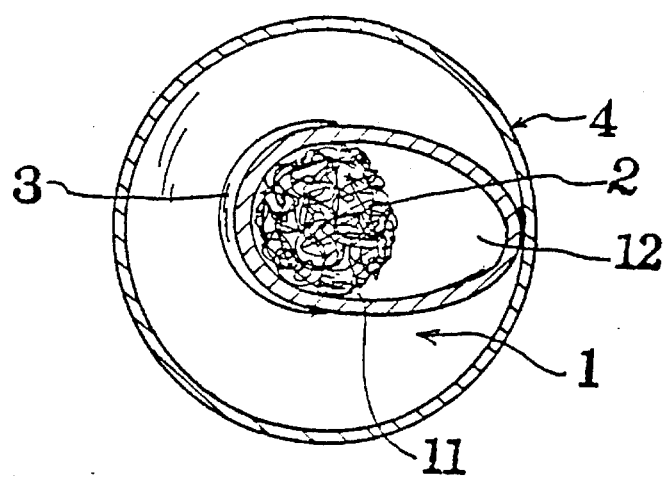
FIG. 2 is a lateral sectional view of the embodiment.

An embodiment of the present invention shown in FIG. 1 and FIG. 2 will be described in detail as follows. A spiral tube 1 made of ceramics has a through hole 11 bored at the center, and a spiral communication hole path 12 is led on the outer circumference of the through hole 11, and a communication hole path 120 is widened at the flowing-in side and the flowing-out side and a flowing-in end portion 121 and a flowing-out end portion 122 are narrowed.

A continuous porous ceramic filter member 2 in netlike state is enclosed in the through hole 11 of the spiral tube 1. The filter member 2 is formed in that a netlike body made of a material to be burned away is immersed in a ceramic liquid and dried and then burned away by burning, and a continuous porous body in netlike state is formed by the remaining ceramic part.

Also the spiral tube 1 is formed in that ceramic slurry is molded in water-absorbing divided molds of gypsum and burned.

Figure 3:
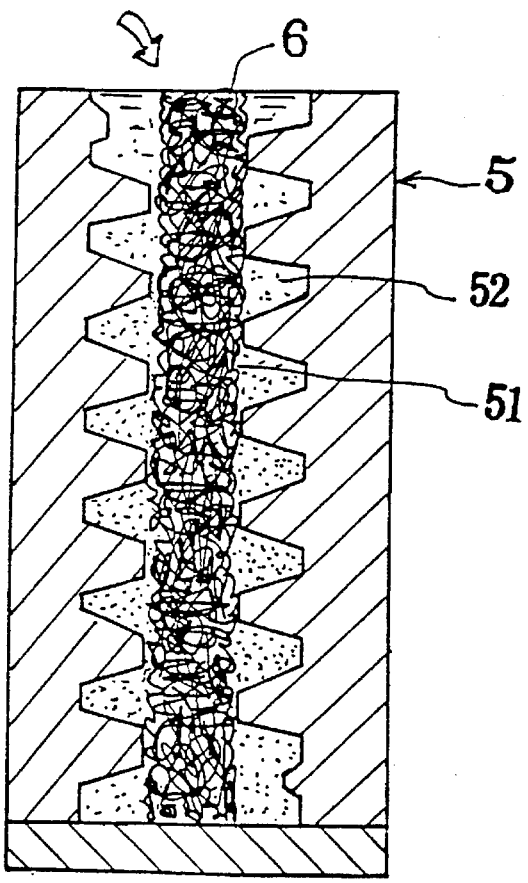
FIG. 3 is a longitudinal sectional view showing state that ceramic slurry is injected in a mold.
Figure 4:
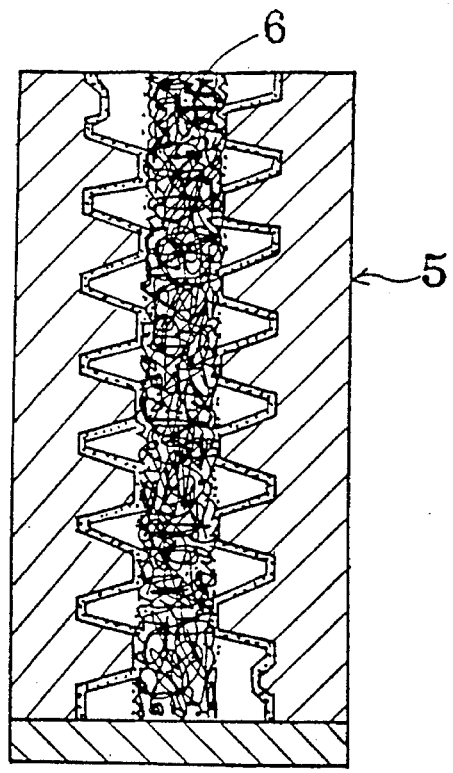
FIG. 4 is a longitudinal sectional view showing state that ceramic slurry is discharged from a mold of gypsum and adhered to the mold and a netlike body.
Figure 5:
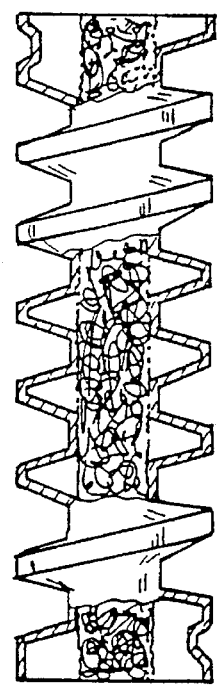
FIG. 5 is a longitudinal sectional view partly cutaway showing state that the mold is removed in the molding state before burning.

That is, as shown in FIG. 3, a netlike body 6 to be burned away is enclosed in a through hole 51 of a mold 5 of gypsum with a spiral communication hole path 52 provided on the outer circumference of the through hole 51 at the center and ceramic slurry is injected and adhered to the inner circumference of the mold 5 and the netlike body 6 and then emitted. Thereby as shown in FIG. 4, a tubular body with a spiral communication hole path formed as an empty space is molded, and this is dried and then burned, and as shown in FIG. 5, the netlike body 6 is burned away and the continuous porous filter member 2 made of ceramics formed by the remaining ceramic part is enclosed integrally in the through hole 11 thereby a spiral tube made of ceramics is formed. The thickness can be suitably selected depending on this adhering time.

In addition, the filter member 2 before burning and the spiral tube 1 before burning may be formed individually, and the filter member 2 may be enclosed in the through hole of the spiral tube 1 and both may be burned together so as to form integral structure.

In this case, small holes may be produced in the spiral tube by the netlike body burned away in forming the filter member 2, but this may be immersed in the ceramic slurry again and may be reburned in the state that the small holes are filled up, thereby at the same time, strength of the filter member 2 of the netlike body can be also increased. A cover 13 at one side may be adhered and burned during the reburning.

Also the filter member 2 and the spiral tube 1 may be burned respectively and the filter member 2 may be enclosed in the through hole 11 of the spiral tube 1. Or the burned filter member 2 may be enclosed in the spiral tube not yet burned, and then the spiral tube may be burned and formed.

A heating wire 3 is wound so as to be arranged at respective outside concave surfaces 13 of the spiral tube 1, and the spiral tube 1 is installed and enclosed in a cylinder 4 and a bottom cover 14 is provided and constituted.

Next, action of this embodiment will be described. Water or oil is supplied from the flowing-in end portion 121 of the cover 13 and passes through the filter member 2 and the communication hole path 12 and is discharged from the flowing-out end portion 122 of the bottom cover 14. In this case, water or oil is purified and improved in quality by the passing contact between the spiral tube 1 and the filter member 2 made of ceramics.

In this embodiment, even if clogging occurs in the filter member 2, water or oil passes through the communication hole path 12 bypassing the clogging portion and enters the filter member 2 from other angle thereby smooth flowing can be secured.

Also since the heating wire 3 is wound on respective outside concave surfaces 13 of the spiral tube 1, the spiral tube 1 itself and the filter member are heated thereby energy is supplied from the spiral tube 1 and the filter member 2 in form of electromagnetic wave radiation and conduction and activation of water and oil is reinforced. If the fluid to be purified is a viscous liquid such as oil, there is effect also in that fluidity becomes good by the heating and clogging decreases. In addition, warmth keeping becomes good by the attaching cylinder 4 and anti-impact property or the like is improved and the spiral tube 1 and the filter member 2 can be protected.

Further, water and oil are injected under pressure of about 5 kg/cm$^2$ and the continuous porous filter member 2 passes, thereby particles of water and petroleum made rapid swirl flowing by pressure applying under influence of far infrared radiation from ceramics are mixed and kneaded by the filter member and the mixed fuel can be obtained in fine interaction. Mixing amount of water to about 50% produces the mixed fuel of stable combustion, and using this, length of flame of combustion within the furnace becomes short in comparison with fuel of A heavy oil of 100%, and the furnace temperature is decreased about 300° C. and both NOx and CO are decreased to about ¼. Also HC is not detected in the exit of the furnace. Consequently, in an internal combustion steam engine using emulsion, pressure of oxidizing the fuel can be utilized and efficiency of the fuel can be improved, and the atmospheric pollution can be significantly prevented.

The embodiment is constituted as above described, however, the present invention is not limited to the embodiment but technical modifications within scope of claims are included in the invention.

Figure 6:
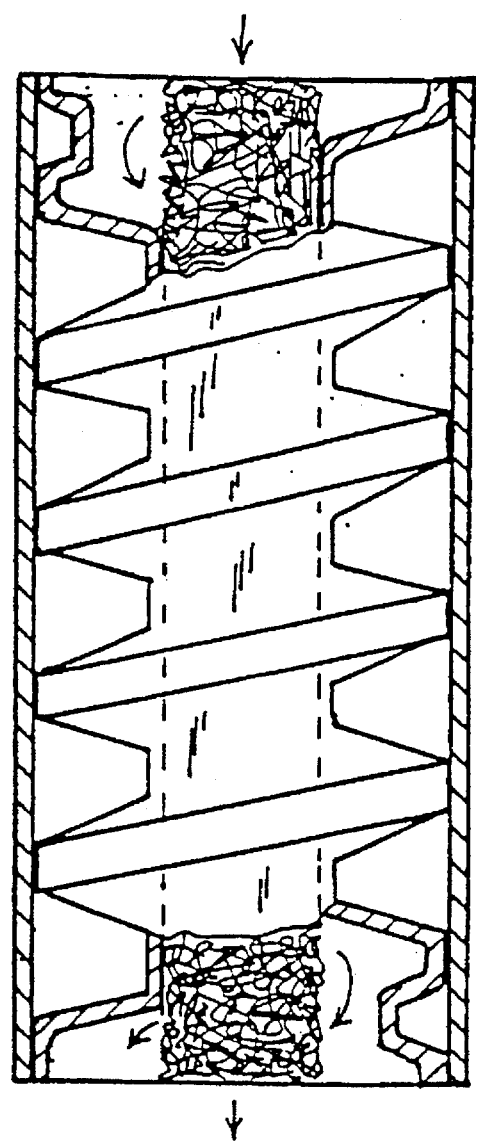
FIG. 6 is a longitudinal sectional view of another embodiment.

For example, irrespective of material and forming means of the spiral tube and the netlike filter member, material holding properties such as heat-resisting property, noncorrosiveness and the like will do. As long as material is good in radiation characteristics of electromagnetic wave and good in heat-resisting property and noncorrosiveness, that made of ceramics is the most suitable. Also shape of crosssection of the spiral communication hole path surrounding the outer circumference of the through hole is not limited. In addition, pitch of the spiral communication hole is arbitrary corresponding to purposes. Further fluid for processing such as purification, activation, quality improvement and the like is arbitrary, and in gases such as an exhaust gas, as shown in FIG. 6, flowing-in/flowing-out portions may be opened wide.

When the spiral tube is installed and enclosed in the attaching cylinder, material or shape of the attaching cylinder is arbitrary. Also when the filter member is heated, in addition to the heating wire, a heat exchanging liquid or a heat exchanging gas such as vapor may be filled and circulated between the outside of the spiral tube and the attaching cylinder.

According to the present invention, since fluid can pass not only within the netlike filter member but also along the spiral tube leading to surround the outer circumference, even if clogging is produced in the filter member, the fluid is sent passing through the spiral communication hole path and effect is significant in that filtering can be carried out smoothly and well.

Also in a fluid processing device of claim 2 or claim 3, since the device is made of ceramics, energy is received well in form of electromagnetic radiation and heat conduction, fluid processing such as activation action of fluid can be further reinforced.

In claim 4, since a spiral tube and a filter member made of ceramics are molded integrally, the molding becomes easy.

In claim 5, a spiral tube is protected and durability is improved, and in claim 6, fluid processing is further reinforced with improvement of durability.

In claim 7, since a filter member and a spiral tube are heated, fluidity of a viscous liquid such as oil becomes good and smooth flowing can be secured.

Further in that of claims 8 and 9, by circulation of a heat exchanging liquid or as filled between the outside of a spiral tube and an attaching cylinder, the filter member and the spiral tube can be easily heated.

What is claimed is:

1. A fluid processing device comprising:

a tube having a helical channel, the helical channel including an inward-facing open side communicating with a central through-hole of the tube, the central through-hole being surrounded by turns of the helical channel, the tube having a screw-like outer surface including a helical concave surface groove;

a porous meshlike filter disposed within the central through-hole in contact with an interior tube portion proximal the open side of the helical channel; and a heating wire wound within the helical concave surface groove;

whereby the helical channel defines a helical fluid path in contact with the filter along an outside surface of the filter and the heating wire may heat fluid within the tube.

2. A fluid processing device comprising:

a tube having a helical channel, the helical channel including an inward-facing open side communicating with a central through-hole of the tube, the central through-hole being surrounded by turns of the helical channel;

a porous meshlike filter disposed within the central through-hole in contact with an interior tube portion proximal the open side of the helical channel;

a sleeve surrounding the tube to form an outer envelope for circulation of hot liquid or gas between the sleeve and an outside surface of the tube; and a heating wire wound within the helical concave surface groove, whereby the heating wire may heat the fluid within the tube; and whereby the helical channel defines a helical fluid path in contact with the filter along an outer surface of the filter and the hot liquid or gas may heat the fluid within the tube.

3. A fluid processing device comprising:

a tube having a helical channel, the helical channel including an inward-facing open side communicating with a central through-hole of the tube, the central through-hole being surrounded by turns of the helical channel; and a porous meshlike filter disposed within the central through-hole in contact with an interior tube portion proximal the open side of the helical channel;

the tube and the filter being comprised of ceramic material;

whereby the helical channel defines a helical fluid path in contact with the filter along an outer surface of the filter.

4. The device according to claim 3, comprising:

means for heating the tube, whereby the ceramic material may, when hot, irradiate the fluid with far infrared radiation.

5. The device according to claim 3, wherein the tube and the filter are integrally formed.

6. The device according to claim 5, wherein the filter is formed by liquid coating on mesh material, wherein the mesh material is burned away.

* * * * *